Sept. 20, 1971          M. HIRSCH ETAL                3,606,516
                   URE METHOD OF MAKING SYNTHETIC
                      KINOFORMS AND HOLOGRAMS
                        Filed Jan. 29, 1969

INVENTORS.
PETER M. HIRSCH
JAMES A. JORDAN, JR.
LOUIS B. LESEM

BY John L Jackson
        ATTORNEY.

United States Patent Office 3,606,516
Patented Sept. 20, 1971

3,606,516
DISCRETE APERTURE METHOD OF MAKING SYNTHETIC KINOFORMS AND HOLOGRAMS
Peter Max Hirsch, James Adam Jordan, Jr., and Louis Bernard Lesem, Houston, Tex., assignors to International Business Machines Corporation, Armonk, N.Y.
Filed Jan. 29, 1969, Ser. No. 794,977
Int. Cl. G02b 27/00
U.S. Cl. 350—3.5         11 Claims

ABSTRACT OF THE DISCLOSURE

A method of constructing the image of a mathematically defined object which may or may not exist in real form. An assumption is made that the image to be formed is of an object made up of equally spaced point sources with the phases of the rays from each source being random.

The wavefront scattered from the equally spaced point source object is calculated and used to form either a conventional digital hologram or a kinoform. If a hologram is constructed, the amplitude and phase of the scattered wavefront are added to the amplitude and phase of a reference wavefront and the squared magnitude obtained. The squared magnitude is then plotted using a gray level photographic plotter, such that a photographic film is produced, the darkening of which over its area, is a measure of the squared amplitude. The thus produced film is then photoreduced to give an intensity distribution at the appropriate wavelength of light. Upon illumination the waves incident upon the photoreduction are diffracted such that the resultant interference at an image plane, produces the desired image in a particular region of the plane.

If a kinoform is constructed, the phase of the desired wavefront of the equally spaced point source object is calculated and the plot tape is written for the plotter with the phase information scaled from zero to $2\pi$ over the gray levels available, such that a photographic film is produced, the darkening of which, over its area, is a measure of phase. The thus produced film is then photoreduced to give a phase distribution at the appropriate wavelength of light. The photoreduction is then bleached such that the emulsion is of known and uniform transmissivity, but with an etched surface, the etch depth of which is proportional to emulsion darkening. Upon illumination the waves incident upon the photoreduction are selectively retarded by the thickness differences of the emulsion, such that the resultant interference at an image plane produces the desired image.

BACKGROUND OF THE INVENTION

Field of the invention

This invention relates to holographic techniques in general, and more particularly to computer generated or synthetic hologram type members.

Description of the prior art

Holography is a twenty-year-old science of image formation from physical diffraction patterns. Computer holography is a subfield, in which the scattered wavefront from an imaginary object is calculated and processed to give the image of the imaginary object.

Computer holography is a new way to construct three-dimensional displays. The combining of the computer with the new science of holography permits a useful generalization of the ideas provided in optical holography. Ordinary photographs are just two-dimensional representations of three-dimensional reality; the viewer must use subjective, prior knowledge to determine the true nature of the scene depicted in the photograph. A properly illuminated hologram forms for the viewer a picture which is identical with that which he would observe if he were looking at the scene itself. A computer-generated hologram yields such a three-dimensional picture, without the original scene ever having to exist.

The true three-dimensional image from a hologram exhibits all the properties that a viewer would see if he were looking at the real object through a window the size of the photograph: for example, if something in the foreground blocks his view of the background, the viewer can look at the scene from another angle and see around the foreground object.

The most obvious application of these computer-generated holograms is as display devices. A three-dimensional image of any mathematically defined object, whether it exists in real form or not, can be displayed visually: for example, mathematical models may be shown; designs and patterns may be "tried out" visually without the need for laborious model building. Another potentially important application is to convert a record of a hologram made with non-visible illumination into a hologram which may then be illuminated with visible light.

Of the several methods for the computer-synthesis of holograms, each begins with a digital representation of the object. This representation may simply be dots of variable darkening placed at the vertices of a two or three-dimensional lattice. Alternatively, the representation may be the variable darkening of squares within the lattice. As discussed in a paper entitled "Computer Synthesis of Holograms for 3-D Display" by the inventors of the subject application, which was published in the Communications of the ACM, vol. 11, No. 10, October 1968, at page 661, the techniques for forming the scattered wavefront from such a digital representation of the object have, in the past, required inordinate amounts of computer time. This is due to the fact that they have required the calculation of a scattered wavefront in which all the significant information in the object had to be mapped into all points of the hologram in what were essentially individual calculations. Several techniques were developed in an attempt to simplify the calculation of the scattered wavefront; however, all of the techniques required inordinate amounts of computer time. Thus in most applications the utilization of computer generated holograms was economically prohibitive.

SUMMARY OF THE INVENTION

Briefly, the diffuse light scatterer used in conventional holography to achieve a "spread" of information which produces a hologram with each individual area containing information about the entire object is approximated by assuming that the image is made up of discrete point apertures with each point radiating, in the preferred embodiment, a spherical outgoing wave such that diffraction is produced from points throughout the object rather than from just the edges of the object. The points which make up the object are regularly spaced which allows the use of a simple Fourier transform of a small block of elements which results in a simplification in the calculation of the wavefronts by several orders less than is required by any other known technique for the computer-generation of holograms.

DETAILED DESCRIPTION OF THE DRAWINGS

Figure 1:
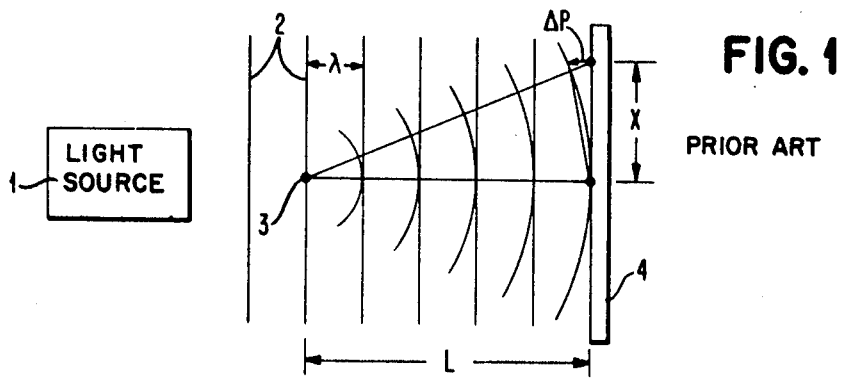
FIG. 1 is an illustration of the method of constructing a Gabor or on line hologram.
Figure 2:
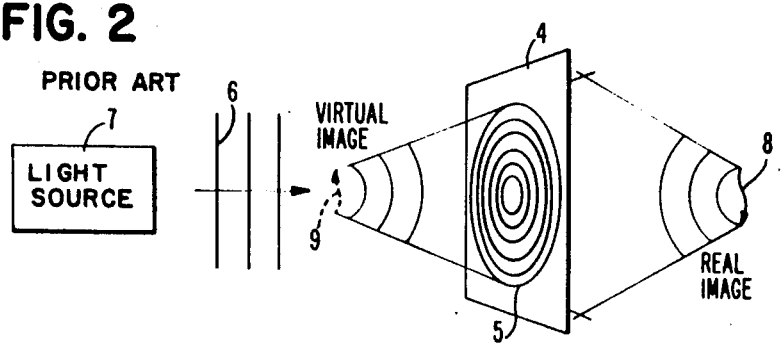
FIG. 2 is a view illustrative of the images produced upon illumination of the on line hologram of FIG. 1.

To aid in an appreciation and understanding of the subject novel technique, refer first to FIG. 1, where there is shown an illustration of the original optical on line holographic technique. In FIG. 1 a light source 1 provides a reference wavefront which is the plane wave 2 which is undiffracted since it passes around an object 3. If a hologram 4 is a distance L from the object, the optical path length difference between the undiffracted reference waves and the object waves is the perpendicular distance to the hologram, from the object, minus the length of a ray to a point X from the object. Therefore, the difference in the path length $P = L - (X^2 + L^2)^{1/2}$. Thus, the reference wavefront is provided by the light which passes undiffracted around the small object placed in its path. Each point on the object forms an interference pattern of rings 5 (FIG. 2) and each of these patterns is similar to a Fresnel zone plate, and acts as a small lens upon illumination which can focus a reconstructing beam into an image point. As illustrated in FIG. 2, the reconstructing wave 6 from the source 7 is focused by means of the hologram 4 into a point in front of the hologram to form the real image 8 and the diverging beam from an apparent point of origin behind the hologram forms a virtual image 9. As can be seen from a consideration of FIG. 2, the real image and virtual image are online and this along with the undiffracted light severely limits the image obtained upon reconstruction from an on-axis hologram.

Figure 3:
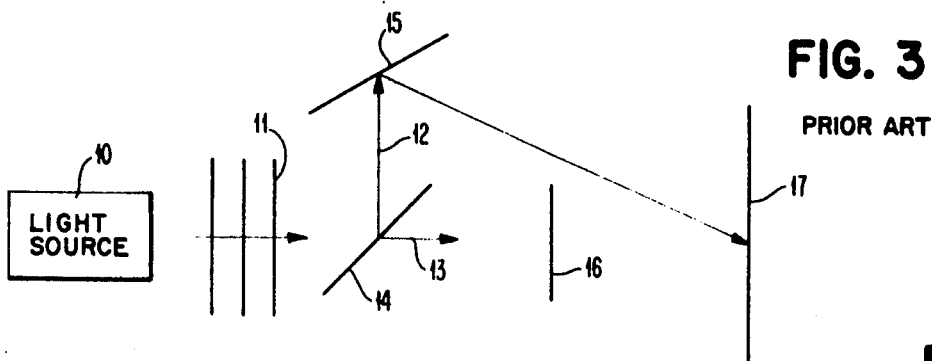
FIG. 3 is a view illustrative of an off axis hologram technique.

Refer next to FIG. 3, which illustrates a two beam technique which was developed to separate desired images from the undesired images and background noise. A coherent light source 10 provides waves 11 which are split into two paths 12 and 13 by beam splitter 14. The waves of path 12 are reflected by the front surface mirror 15 onto the hologram 17 to provide the reference beam while the waves of path 13 are diffracted by the object 16. The waves from both paths are then recorded at the hologram plane. Upon reconstruction by a plane coherent wave, the central order (undiffracted light) appears in the shadow of the hologram and as with conventional diffraction gratings the virtual first order and real first order appear on opposite sides of the central order.

To provide a true hologram or redundant hologram, a diffuser is placed between the beam splitter and object of FIG. 3. The diffuser is usually a ground glass plate. The diffuser spreads out the illuminating wavefront and randomizes the phases of the light incident on the various parts of the object. The result is a spreading of information from all parts of the object on all areas of the hologram plane. If the hologram is broken into pieces, each piece will still provide a reconstruction of the complete image.

In general the spatial frequencies in a diffracted wave obtained without a diffuser are low. However, if a diffuser is placed before the object, the phases of the various parts of the wavefront striking the object are random. In this case, extremely high spatial frequencies are introduced. In optical holography the necessity of recording high spatial frequencies implies the use of an emulsion with very high resolution, and it is not unusual to use emulsions having 500–2000 lines/mm. resolution.

The introduction of diffuse illumination (and thus of high spatial frequencies) makes the computations required to directly model this phenomenon increase beyond reasonable bound, and alternative approaches to achieving a "spread" of information in computer-generated are required.

To aid in the understanding of the high spatial frequency problem, a mathematical analysis will be presented.

The optical wavefront at the halogram plane of FIG. 3 is given by $$d(x,y) = h(x,y) + r(x) \qquad (1)$$

where $h(x,y)$ is the wavefront scattered from the object and $r(x)$ is the reference wavefront.

Examination of $h(x,y)$ indicates that it may be written as $$h(x,y,x_0) = \int T(a,b,c) F(x-a, y-b, z_0-c) \, da\,db\,dc \qquad (2)$$

where the object $T(a,b,c) = T_r(a,b,c) e^{i\psi(a,b,c)}$ is described by a real transmittance (or reflectance) $T_r(a,b,c)$ and a phase shift $\psi(a,b,c)$. F is an appropriate complex-valued function which describes the propagation of the light from the point $(a,b,c)$ in the object to the point $(x,y)$ on hologram plane. (F depends upon the type of illumination used). The function $\psi(a,b,c)$ models either the diffuse scattering (phase changes of the wavefront at the object) from a three-dimensional object or the diffuser plate used in a transmission hologram apparatus. If the reference $r(x)$ is a plane wave, it is given by $r(x) = A e^{ikx}$, $k = 2\pi\theta/\lambda$, where $\lambda$ is the wavelength of the monochromatic light used, A is some constant, and is the angle between the reference beam and the object beam.

The photographic emulsion is sensitive to $|d|^2$, with the result that, using the convolutional notation, the emulsion darkening is a function of $$D(x,y,z_0) = |d|^2 = $$
$$H(x,y,z_0) + A\overline{(T*F)} e^{ikx} + A\overline{(T*F)} e^{ikx} \qquad (3)$$

where $$H(x,y,x_0) = |h|^2 + |r|^2 = |T*F|^2 + A^2$$

When the developed emulsion is illuminated, there is reconstructed from $H(x,y,x_0)$ a "central order" reconstruction. At an angle $\theta$ an observer would see a first order virtual image, and at $-\theta$ a first order real image. These two images come from the second and third terms of Eq. 3. The flexibility of digital holography allows $H(x,y,z_0)$ to be adjusted such that $D(x,y,z_0) \geq 0$. Holograms constructed in this manner lose a minimum of the incident energy to the central order, with the subsequent result that the desired image is brighter. Furthermore, almost the entire bandwidth of the hologram can be used for the twin images. The function $\psi(a,b,c)$ used to describe the diffuse scattering of light from the object introduces a considerable problem for digital holography since it leads to extremely high spatial frequencies limited only by the aperture of the hologram, and alternative approaches to achieving a "spread" of information in computer-generated holograms were sought.

One modification considered to alleviate the requirement of large amounts of calculation time and still achieve a redundancy was to consider the wavefront as $$h(x,y) = \int T(a,b) g(x-a, y-b) F(x-a, y-b) \, da\,db \qquad (4)$$

where $g(x,y)$ is a real, nonnegative, and convex function. For example, $g(x,y) = \exp(x^2 + y^2)$. This technique does accomplish some redundancy, but it has the bad effect of increasing the high spatial frequencies of the object. The edges are too emphasized for this technique to be considered promising.

A further approach can be based on treating the hologram emulsion as a nonlinear detector. Rather than mapping the hologram linearly into the plotting range, a nonlinear function can be used: for example, $$\left| \frac{T*F}{|T*F|} + e^{isx} \right|^2, s = \frac{2\pi\theta}{\lambda} \qquad (5)$$

was tried.

This also resulted in emphasizing the edges of the object too severely.

Two techniques do yield successful digital holograms. In one, the object, thought of as a set of variable-intensity rectangular apertures, is diffusely illuminated, but the spatial frequencies are limited to just those which contribute to the spread of information over the limited area of the hologram plane in which the hologram is formed. In the other, the object is considered as a set of variable-intensity discrete points, and this avoids a direct modeling of the diffuser.

In the first technique, the object is thought of as a variable-intensity aperture given by the function $T(a,b)$. If diffuse back lighting is used, the wavefront at the object plane is described by the function $$D(a,b) = T(a,b) \exp\left\{\frac{2\pi i}{\lambda z}[R(a)a^2 + R(b)b^2]\right\}$$

where $R(a)$ and $R(b)$ are random functions whose range is between 0 and $2\pi$. For simplicity, $D(a,b)$ is termed the diffuse object.

A perfectly diffuse object would be one in which $R(a)$ and $R(b)$ were completely random and would in principle require an infinite frequency spectrum for a complete description. Since the amount of computation is limited to a reasonable length of time, it is necessary to somehow limit the frequencies introduced by the diffusion process. One-dimensional arguments can be made to show that $R(a)$ and $R(b)$ can be limited, and the resultant frequency spectrum made reasonable.

Figure 4:
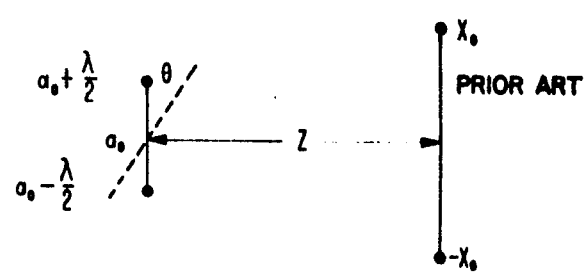
FIG. 4 is an illustration of a mathematical analytical set up of one prior art approach to the generation of synthetic holograms.

However, suppose that there are two points at the extreme ends of adjacent apertures a distance $h$ apart from one another and centered at $a_0$ as illustrated in FIG. 4. For a redundant hologram information from those two points must be spread over the hologram plane from $x_0$ to $-x_0$, or between the angles $\theta$ and $-\theta$, where $\theta = \arctan(x_0/z)$. In order for there to be constructive interference between waves from the two points, there must be a phase difference of $2\pi$ between the two waves. Note also that $\theta = \arctan(d/h)$ and $d$ is limited by the sampling theorem to $d \leq \lambda/2$. If $d > \lambda/2$ the wavefront would not be sampled at a high enough rate as it passed through the object, which would then be aliased. This implies that $R(a)$ can be limited to values between $\pm \arctan(x_0/z)$.

The maximum frequency recorded in the hologram, and due to the diffuser, is $(x_0/2\pi z)$. This is a very large number unless $x_0$ is very small or $z$ is very large. Therefore this approach is practical only for microscopic objects or in the Fraunhofer, or far field region.

After a number of various approaches, the subject novel technique was invented. In this technique the object is considered to be a collection of discrete point apertures, with each aperture radiating a spherical outgoing wave. A random phase for the wavefront incident upon the apertures is assumed.

Figure 5:
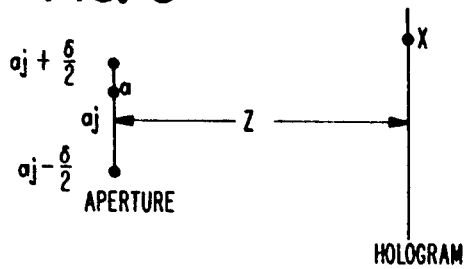
FIG. 5 is an illustration of a mathematical set up used in conjunction with the Kirchoff diffraction theory.

Refer next to FIG. 5. In one dimension and for a single aperture, the Kirchoff diffraction theory gives the propagation of the wavefront as $$H(x, a_j) \sim c \int_{a_j - \delta/2}^{a_j + \delta/2} e^{\frac{i\pi}{\lambda z}(x-a)^2} e^{i\alpha(a)} da \quad (6)$$

for an aperture of length $\delta$ centered at $a_j$ and propagated a distance $z$, and for $z \gg |x-a|$ and where $\alpha(a)$ is a random function. As $\lambda \to 0$.

$$h(x, a_j) \approx c' e^{\frac{i\pi}{\lambda z}(x-a_j)^2} e^{i\alpha(a_j)} \quad (7)$$

For several point apertures, each of transmittance $T_r(a_j)$ and having a phase shift $\alpha(a_j)$, $h(x,a_j)$ is summed over $a_j$ to obtain $$h(x) = \sum_{j=-m/2}^{\frac{m}{2}-1} T(a_j)h(x, a_j) = c' \sum_{j=-m/2}^{+\frac{m}{2}-1} T(a_j) e^{iK(x-a_j)^2} \quad (8)$$

where $K = \pi/\lambda z$ and $T(a_j) = T_r(a_j)e^{i\alpha(a_j)}$

Rewriting the above equation yields $$h(x) = c' e^{iKx^2} \sum_{j=-m/2}^{m/2-1} T(a_j) e^{-2iKa_j x} \quad (9)$$

The evaluation of this sum at equally spaced points, so that $a_j = j\Delta a$ and $x = l\Delta x$, results in $$h(x_l) = c' e^{iKx^2} \sum_{j=-m/2}^{m/2-1} T(a_j) e^{iK(\Delta a)^2 j^2} e^{-2iK\Delta a \Delta x l j} \quad (10)$$

where $= -m/2 \ldots m/2-1$.

If in addition the relationship $\Delta x = \lambda z/\Delta am$, is assumed, then $$h(x_l) = c' e^{iK(\Delta x)^2 l^2} \sum_{j=-m/2}^{m/2-1} T(a_j) e^{iK(\Delta a)^2 j^2} e^{-2\pi i l j/m} \quad (11)$$

This can be rewritten as $$h(x) = c' e^{iK(\Delta x)^2 l^2} \widehat{TE}(x_l) \quad (12)$$

where $$TE(a_i) = T(a_i) e^{iK(\Delta a)^2 j^2}$$

and $\widehat{TE}$ is the finite Fourier transform of TE. $TE(x_l)$ is a periodic function of $l$, with period $m$ and containing one element for each element of the object array. Repetitions of that sum contribute to a "spread" of the information, and kinoforms made using these techniques can be made as redundant as optical holograms. Increasing the number of repetitions implies that $m \cdot \Delta x \ll m \cdot \Delta a$ is desired; i.e., $\Delta x \ll \Delta a$. $m\Delta x$ should be smaller than the diameter of the lens viewing the kinoform so that at least one period would be visible at any instant. For example, if the virtual image is examined by eye, the diameter of the pupil should be greater than $m\Delta x$.

It should be noted that the term before the sum is not periodic in general. Also since $h(x)$ is a continuous function, it must be sampled correctly, that is, $\Delta x$ must be small enough so that $h(x_l)$ is a good approximation to $h(x)$.

While the foregoing equations described the desired wavefront from a single dimension, the description of a two dimensional object wavefront could be obtained by taking a double summation of Equation 10 to provide $$h(x_l, y_t, z) = c' e^{i\pi/\lambda z[(\Delta x)^2 l^2 + (\Delta y)^2 t^2]} \sum_{j=-m/2}^{m/2-1} \sum_{s=-n/2}^{n/2-1}$$

$$T(a_j, b_s, z) e^{i\pi/\lambda z[(\Delta a)^2 j^2 + (\Delta b)^2 s^2]} e^{-2\pi i(l j/m + t s/n)} \quad (13)$$

where $l = -m/2 \ldots +m/2-1$;

$$t = -n/2 \ldots +n/2-1$$

and for a three dimensional object, an additional summation of Equation 13 would be taken to provide $$h(x_l, y_t) = \sum_{p=1}^{n} h(x_l, y_t, z_p) \quad (14)$$

During calculation, the image is considered to be a three-dimensional array of point apertures. Each aperture is assigned a value between zero and one, where zero implies that no light is transmitted through the aperture, one implies and open aperture, and the values between represent the relative transmittance of the apertures. In one program actually run each plane had a grid of 64 x 64 apertures. There may be an arbitrary number of such planes.

The first step in generating the plot tape is the calculation of the finite Fourier transform of function $TE(a_j)$. In this calculation zeros are appended to the $TE(a_j)$ array so that it is a vector of $m$ elements. This interpolates the $h(x_l)$ array. Thus, $$\widehat{TE}(l/p) = \sum_{j=-m/2}^{m/2-1} T(a_j) e^{iK(\Delta a)^2 j^2} e^{2\pi i(l/p)j/m} \quad (15)$$

and in the interpolate transform, $$\widehat{TE}(l/p) = \sum_{j=-n/2}^{n/2-1} T(a_j)e^{iK(\Delta a)^2 j^2}e^{2\pi i l j/n} \quad (16)$$

where $n=pm$, and $T(a_j)=0$ for values of $j=-n/2$, $-n/2+1 \ldots -m/2-1$, and $j=m/2$, $m/2+1 \ldots +n/2-1$. $l$ has the range from $-n/2$ to $n/2-1$.

Since the array TE is of period $n$, it may be repeated as many times as necessary, to provide a kinoform as large as desired, and of arbitrary redundancy.

The reference wavefront must, of course, be added to Equation 12 as indicated in Equation 1 in the manner of Equation 3, which is the step in which the squared magnitude of the sum of the reference wave and the diffracted wave is computed. The reference beam can be of many forms. The two most common are those which describe a plane wave, $$r(x_1) = e^{iK\theta x_1}$$

and a spherical wave, $$r(x_1) = e^{iK(x_1-x_0)^2}$$

A hologram constructed using a spherical reference wave will, in general, have lower frequencies than one constructed using a plane reference wave. This follows since the wavefronts from the point apertures are spherical, and the deviations between two spherical waves are less than those between a spherical wave and a plane wave.

While the subject technique has been described in conjunction with the construction of digital holograms it is useful in the construction of other similar pseudo optical devices. One such device is disclosed in a co-pending U.S. patent application, Ser. No. 778,525 of common inventorship, entitled "Method of Manufacturing Wave Shaping Objects," assigned to the assignee of the subject application.

Once the digital hologram is calculated, it is plotted on a multi-gray level plotter such as the IBM type 1780. The calculated hologram is scaled between 0 and 31, since the plotter has 32 gray levels. The plot is accomplished on a sheet of film 40" x 60". Each point in the hologram array $H(x_1)$ is mapped into a V x V square of points, $1 \leq V \leq 8$, all of the same intensity. The plotter permits a maximum of 8,000 × 12,000 points at a spacing of .005".

In order to increase the spatial frequency from the plots made by the plotter, the plots are photoreduced. The result is a diffraction pattern appropriate to the wavelength (6328A) of a He-Ne laser.

The photoreduced holograms are made on Kodak Panatomic[1] X film and have a frequency content greater

[1] Reg. trademark, Eastman Kodak Co.

than 50 cycles/mm. The film is bleached, as described by V. Russo and S. Sottini in an article entitled "Bleached Holograms," Applied Optics 7, (1968) p. 202, so that it becomes a "phase hologram." The bleach etches away the developed grains, producing a path difference, and hence a phase change, in the emulsion. This phase change is proportional to the original darkening of the emulsion. The result is a reconstruction of the object which is as sharp as that obtained with unbleached holograms but which is much brighter since the bleached hologram transmits much more light.

The thus produced holograms do not have to be reconstructed in light from a laser. Reconstructions can be made in any quasi-monochromatic light, such as that from a mercury-vapor discharge lamp used with an appropriate filter. The image size changes in proportion to the wavelength of the illumination. They can even be reconstructed by "white" light from point sources, e.g. a match held a few feet from the hologram.

While the invention has been particularly shown and described with reference to several embodiments, it will be understood by those skilled in the art that various changes in form and detail may be made without departing from the spirit and scope of the invention.

What is claimed is:

1. The method of generating an image of an object at an image plane comprising the steps of:
    representing the object in a regular planar lattice by $N \times M$ point apertures of variable darkening, said apertures being arranged in a rectangle with N equally spaced apertures in a first direction and M equally spaced apertures in a second direction normal to said first direction to form a variable darkening function T;
    representing the diffuse illumination of the object by a phase factor which is a random function of the coordinates of said point apertures;
    representing the initial wave front at said image plane by multiplying by machine said variable darkening function T by said phase factor;
    calculating by machine the exact, periodic $N \times M$ finite Fourier transform of said initial wave front, wherein the kernel of the finite Fourier transform is chosen to correspond to the distance separating the image plane from an arbitrary plane and wherein the spacing $\Delta x$, $\Delta y$ between the calculated elements in two coordinates of the transform are dependent upon said separation distance;
    calculating by machine, at a point with Cartesian coordinates $x_t$ and $y_t$ in said arbitrary plane, the form of the wave front which would propagate from an image represented by said lattice of point apertures with said random phase factors by reducing the coordinates $$\left[\frac{x_t}{\Delta_x} \mid \bmod N\right] = n_t \text{ and } \left[\frac{y_t}{\Delta_y} \mid \bmod M\right] = m_t$$

and multiplying the $n_t$, $m_t$ element of said $M \times N$ finite Fourier transform by a focusing phase factor dependent upon the coordinates $x_t$, $y_t$;
    repeating the above described multiplication of elements $n_t$, $m_t$ for additional points in said arbitrary plane to form a description of the wave front in said plane propagating from said lattice of point apertures representing said object;
    adding said calculated wave front to a reference wave front to provide a summed wave front;
    forming an imaging element in accordance with said summed wave front;
    illuminating said imaging element to generate said desired image.

2. The method of claim 1 wherein said lattice is a three dimensional lattice.

3. The method of claim 1 wherein said calculated image wavefronts include amplitude and phase, which are added to the amplitude and phase of said reference wavefront to provide the squared magnitude of said image and reference wavefronts.

4. The method of claim 1 wherein said calculated image wavefronts include only phase information which is added to the phase content of said reference wavefront.

5. The method of claim 3 wherein said plot is photoreduced and said photoreduction bleached prior to illumination.

6. The method of claim 5 wherein for a single dimensional object said calculation of said wave front to be plotted is obtained by:
    (A) defining the propagation of the wave fronts from each of said object apertures as:

$$h(x,a_j) = c \int_{a_j-\delta/2}^{a_j+\delta/2} \exp\left\{\frac{2\pi}{\lambda z}((x-a)^2+z^2)^{1/2}\right\} da \quad (1)$$

(B) with $z \gg |x-a|$ approximating the square root of (A) to obtain $$h(x,a_j) \approx c' \int_{a_j-\delta/2}^{a_j+\delta/2} \exp\left\{\frac{i\pi}{\lambda z}(x-a)^2\right\} da \quad (2)$$

$$c' \exp\frac{i\pi}{\lambda z}(x-a_j)^2 \sin\frac{\delta\pi}{z\lambda}(x-a_j)$$

which as $\delta \to 0$ yields $$h(x,a_j) \approx c' \exp\frac{i\pi}{\lambda z}(x-a_j)^2 \quad (3)$$

(C) with each of said dots having an intensity of $T(a_j)$ summing $h(x, a_j)$ over $a_j$ to obtain $$h(x) = \sum_{j=-m/2}^{m/2-1} T(a_j) h(x,a_j) \quad (4)$$

$$= c' \sum_{j=-m/2}^{m/2-1} T(a_j) \exp[iK(x-a_j)^2], \quad K=\pi/\lambda z$$

which rewritten is $$h(x) = c' e^{iKx^2} \sum_{j=-m/2}^{m/2-1} T(a_j) e^{-2iKa_j x} e^{iKa_j^2} \quad (5)$$

(D) evaluating the summation of (C) so that $a_j = j\Delta a$ and $x = l\Delta x$ to provide $$h(x_l) = c' e^{iKx^2} \sum_{j=-m/2}^{(m/2)-1} T(a_j) e^{iK(\Delta a)^2 j^2} e^{-2iK\Delta a \Delta x l j}$$

$$l = -m/2 \ldots (m/2)-1 \quad (6)$$

which if $$TE(a_j) = T(a_j) e^{iK(\Delta a)^2 j^2} \quad (7)$$

and if $\widehat{TE}(a_j)$ is the finite transform of TE yields $$h(x_l) = c' e^{iK(\Delta x)^2 l^2} \widehat{TE}(l) \quad (8)$$

wherein:
$h(x, a_j)$ = the complex amplitude of the wave front at the coordinate $x$ in the wave front plane from the $j^{th}$ aperture with coordinate $a_j$ in the object plane;
$\delta$ = the width of the aperture;
$z$ = the distance from the object plane to the wave front plane;
$\lambda$ = the wavelength of the radiation being considered;
$T(a_j)$ = the intensity at the point $a_j$ in the object plane;
$m$ = number of points between coordinates $-m/2$ to $(m/2)-1$
$l$ = summation index in the $x$ space (object space)
$j$ = summation index in the a space (wave front space)

7. The method of claim 6 wherein the array $\widehat{TE}$ is repetitively calculated.

8. The method of claim 7 wherein the finite transform $\widehat{TE}(a_j)$ is calculated while interpolating the array $(hx_l)$ by appending a string of zeros to the array $TE(a_j)$ which provides $$TE(1/p) = \sum_{j=-/m2}^{(m/2)-1} T(a_j) e^{iK(\Delta a)^2 j^2} e^{2\pi i(1/p)j/m}$$

$$= \sum_{j=-n/2}^{(n/2)-1} T(a_j) e^{iK(\Delta a)^2 j^2} e^{2\pi i l j/n}$$

$$j = -n/2, \ -(n/2)+1 \ldots -(m/2)-1$$

$$m/2, \ (m/2)+1 \ldots (n/2)-1 \quad (9)$$

where $n = pm$ and $T(a_j) = 0$
wherein:
$p$ = degree of interpolation obtained by adding zeros in the object space to obtain more values calculated on the wave front space;

9. The method of claim 7 wherein for a two dimensional object a double summation of Equation 6 is taken to provide $$h(x_l, y_t, z) = c' e^{i\pi/\lambda z[(\Delta x)^2 l^2 + (\Delta y)^2 t^2]} \sum_{j=-m/2}^{m/2-1} \sum_{s=-n/2}^{n/2-1}$$

$$T(a_j, b_s, z) e^{i\pi/\lambda z[(\Delta a)^2 j^2 + (\Delta b)^2 s^2]} e^{-2\pi i(lj/m + ts/n)} \quad (10)$$

where:
$l = -m2 \ldots +m/2-1$
$t = -n/2 \ldots +n/2-1$

10. The method of claim 7 wherein for a two dimensional object a double summation of Equation 6 is taken to provide $$h(x_l, y_t) = \sum_{q=1}^{N} h(x_l, y_t, z_p) \quad (11)$$

wherein:
$q$ = index of the planes on the object space and there are N of these planes.

11. The method of claim 10 wherein the finite transform $\widehat{TE}(a_j)$ is calculated while interpolating the array $h(x_l)$ by appending a string of zeros to the array $TE(a_j)$.

References Cited

Cathey, Jour. of the Optical Society of America, vol. 55, April 1965, p. 457.

Stroke et al., Proc. of the IEEE, vol. 55, January 1967, pp. 109–111.

Lesem et al., Proc. of the Symposium on Modern Optics, Polytechnic Press, New York, 1967, pp. 681–691.

Keeton, Proc. of the IEEE, vol. 56, No. 3, March 1968, pp. 325–327.

DAVID SCHONBERG, Primary Examiner

R. J. STERN, Assistant Examiner

U.S. Cl. X.R.

350—162

UNITED STATES PATENT OFFICE
CERTIFICATE OF CORRECTION

Patent No. 3,606,516  Dated September 20, 1971

Inventor(s) Peter M. Hirsch, James A. Jordan, Jr. & Louis B. Lesem

It is certified that error appears in the above-identified patent and that said Letters Patent are hereby corrected as shown below:

Column 4, line 10 change x to z $$h(x,y,z_0) = \int T(a,b,c) \, F(x-a, y-b, z_0-c) \, da \, db \, dc$$

Column 4, line 35 change x to z $$H(x,y,z_0) = |h|^2 + |r|^2 = |T*F|^2 + A^2$$

Column 6, line 7 should read as follows:

that $a_j = j\Delta a$ and $x = \ell \Delta x$, results in

Column 6, line 9 should read as follows:

$$h(x_\ell) = c'e^{iKx^2} \sum_{j=-m/2}^{m/2-1} T(a_j) e^{iK(\Delta a)^2 j^2} e^{-2iK\Delta a \Delta x \ell j}$$

Column 6, line 15 should read as follows:

$$h(x_\ell) = c' e^{iK(\Delta x)^2 \ell^2} \sum_{j=m/2}^{m/2-1} T(a_j) e^{iK(\Delta a)^2 j^2} e^{-2\pi i \ell j / m}$$

Column 6, line 20-22 should read as follows:

where $TE(a_j) = T(a_j) \, e^{iK(\Delta a)^2 j^2}$

Column 6, line 45-52 should read as follows:

$$h(x_\ell, y_t, z) = c' e^{i\pi/\lambda z [(\Delta x)^2 \ell^2 + (\Delta y)^2 t^2]} \sum_{j=-m/2}^{m/2-1} \sum_{s=-n/2}^{n/2-1} T(a_j, b_s, z) e^{i\pi/\lambda z [(\Delta a)^2 j^2 + (\Delta b)^2 s^2]} e^{-2\pi i (\ell j/m + ts/n)}$$

where $\ell = -m/2, \ldots, +m/2-1$; $t = -n/2, \ldots, +n/2-1$

UNITED STATES PATENT OFFICE
CERTIFICATE OF CORRECTION

Patent No. 3,606,516     Dated September 20, 1971

Inventor(s) Peter M. Hirsch, James A. Jordan, Jr. & Louis B. Lesem

It is certified that error appears in the above-identified patent and that said Letters Patent are hereby corrected as shown below:

PAGE - 2

Column 6, line 55-57 should read as follows:

$$h(x_\ell, y_t) = \sum_{p=1}^{N} h(x_\ell, y_t, z_p)$$

Column 6, lines 73-75 should read as follows:

$$\widehat{TE}(\ell/p) = \sum_{j=-m/2}^{m/2-1} T(a_j) e^{iK(\Delta a)^2 j^2} e^{2\pi i (\ell/p) j/m}$$

Column 7, line 2-4 should read as follows:

$$\widehat{TE}(\ell/p) = \sum_{j=-n/2}^{n/2-1} T(a_j) e^{iK(\Delta a)^2 j^2} e^{2\pi i \ell j/n}$$

Column 7, line 7 should read as follows:

+n/2-1. $\ell$ has the range from -n/2 to n/2-1.

Column 7, line 19-21 should read as follows:

$$r(x_\ell) = e^{iK\theta x_\ell}$$

and a spherical wave, $$r(x_\ell) = e^{iK(x_\ell - x_0)^2}.$$

UNITED STATES PATENT OFFICE
CERTIFICATE OF CORRECTION

Patent No. 3,606,516                    Dated September 20, 1971

Inventor(s) Peter M. Hirsch, James A. Jordan, Jr. & Louis B. Lesem

It is certified that error appears in the above-identified patent and that said Letters Patent are hereby corrected as shown below:

PAGE - 3

Column 8, line 75 should read as follows:

$$h(x, a_j) = c \int_{a_j - \delta/2}^{a_j + \delta/2} \exp\left\{\frac{2\pi}{\lambda z}((x-a)^2 + z^2)^{1/2}\right\} da$$

Column 9, line 36 should read as follows:

$$h(x_1) = c' e^{iK(\Delta x)^2 \ell^2} \widehat{TE}(\ell)$$

Column 10, line 21 should read as follows:

$$h(x_\ell, y_t, z) = c' e^{i\pi/\lambda z [(\Delta x)^2 \ell^2 + (\Delta y)^2 t^2]} \sum_{j=-m/2}^{m/2-1} \sum_{s=-n/2}^{n/2-1}$$

Signed and sealed this 18th day of April 1972.

(SEAL)
Attest:

EDWARD M. FLETCHER, JR.
Attesting Officer

ROBERT GOTTSCHALK
Commissioner of Patents